United States Patent
Ichikawa et al.

(10) Patent No.: US 9,259,721 B2
(45) Date of Patent: Feb. 16, 2016

(54) POROUS MATERIAL, MANUFACTURING METHOD OF THE SAME, AND HONEYCOMB STRUCTURE

(71) Applicant: NGK Insulators, Ltd., Nagoya (JP)

(72) Inventors: Shuichi Ichikawa, Nagoya (JP); Atsushi Mizuno, Nagoya (JP)

(73) Assignee: NGK Insulators, Ltd, Nagoya (JP)

( * ) Notice: Subject to any disclaimer, the term of this patent is extended or adjusted under 35 U.S.C. 154(b) by 0 days.

(21) Appl. No.: 14/478,051

(22) Filed: Sep. 5, 2014

(65) Prior Publication Data

US 2015/0093540 A1  Apr. 2, 2015

(30) Foreign Application Priority Data

Sep. 27, 2013  (JP) .................................. 2013-201811

(51) Int. Cl.

| | |
|---|---|
| *C04B 35/00* | (2006.01) |
| *C04B 38/00* | (2006.01) |
| *B01J 29/70* | (2006.01) |
| *C04B 35/565* | (2006.01) |
| *C04B 35/584* | (2006.01) |
| *C04B 35/573* | (2006.01) |
| *C04B 35/591* | (2006.01) |
| *C04B 111/00* | (2006.01) |

(52) U.S. Cl.
CPC ........... *B01J 29/7049* (2013.01); *C04B 35/565* (2013.01); *C04B 35/573* (2013.01); *C04B 35/584* (2013.01); *C04B 35/591* (2013.01); *C04B 38/0006* (2013.01); *C04B 38/0038* (2013.01); *C04B 2111/0081* (2013.01); *C04B 2111/00793* (2013.01); *C04B 2235/3206* (2013.01); *C04B 2235/3217* (2013.01); *C04B 2235/3224* (2013.01); *C04B 2235/3225* (2013.01); *C04B 2235/3227* (2013.01); *C04B 2235/3229* (2013.01); *C04B 2235/3244* (2013.01); *C04B 2235/3418* (2013.01); *C04B 2235/3481* (2013.01); *C04B 2235/3826* (2013.01); *C04B 2235/3873* (2013.01); *C04B 2235/80* (2013.01)

(58) Field of Classification Search
None
See application file for complete search history.

(56) References Cited

U.S. PATENT DOCUMENTS

| | | |
|---|---|---|
| 2003/0108458 A1 | 6/2003 | Ichikawa et al. |
| 2003/0110744 A1* | 6/2003 | Gadkaree et al. ............... 55/523 |
| 2004/0266617 A1 | 12/2004 | Fujii et al. |
| 2005/0143255 A1 | 6/2005 | Morimoto et al. |
| 2009/0065982 A1 | 3/2009 | Morimoto et al. |
| 2009/0131253 A1 | 5/2009 | Fujii et al. |
| 2010/0218473 A1 | 9/2010 | Kikuchi et al. |
| 2012/0110988 A1 | 5/2012 | Dotzel et al. |
| 2012/0117952 A1 | 5/2012 | Dotzel et al. |
| 2012/0117953 A1 | 5/2012 | Andersen et al. |
| 2012/0121486 A1 | 5/2012 | Collier et al. |
| 2012/0122660 A1 | 5/2012 | Andersen et al. |
| 2012/0177875 A1* | 7/2012 | Beall et al. .................... 428/116 |
| 2014/0065042 A1 | 3/2014 | Andersen et al. |
| 2014/0072490 A1 | 3/2014 | Dotzel et al. |
| 2014/0370235 A1 | 12/2014 | Takahashi et al. |

FOREIGN PATENT DOCUMENTS

| | | | |
|---|---|---|---|
| DE | 10 2011 010 103 A1 | 8/2011 | |
| EP | 1 600 432 A1 | 11/2005 | |
| EP | 1 666 146 A1 | 6/2006 | |
| EP | 2 604 323 A1 | 6/2013 | |
| EP | 2 687 502 A1 | 1/2014 | |
| JP | 4082559 B2 | 4/2008 | |
| JP | 4227347 B2 | 2/2009 | |
| JP | 4464568 B2 | 5/2010 | |
| WO | 2009/069731 A1 | 6/2009 | |
| WO | 2013/136848 A1 | 9/2013 | |

OTHER PUBLICATIONS

Extended European Search Report (Application No. 14186314.2) dated Mar. 27, 2015.
U.S. Appl. No. 13/849,695, filed Mar. 25, 2013, Izumi, Yunie.
U.S. Appl. No. 14/196,411, filed Mar. 4, 2014, Izumi, Yunie.
U.S. Appl. No. 14/476,804, filed Sep. 4, 2014, Izumi, Yunie.
U.S. Appl. No. 14/476,813, filed Sep. 4, 2014, Izumi, Yunie.

* cited by examiner

*Primary Examiner* — David Sample
*Assistant Examiner* — Nicolas W Jordan
(74) *Attorney, Agent, or Firm* — Burr & Brown, PLLC

(57) ABSTRACT

There is disclosed a porous material. The porous material contains aggregates, and a bonding material which bonds the aggregates to one another in a state where pores are formed among the aggregates, the bonding material contains crystalline cordierite, the bonding material further contains a rare earth element or a zirconium element, and a ratio of a mass of the bonding material to a total mass of the aggregates and the bonding material is from 12 to 45 mass %. The bonding material preferably contains, in the whole bonding material, 8.0 to 15.0 mass % of MgO, 30.0 to 60.0 mass % of $Al_2O_3$, 30.0 to 55.0 mass % of $SiO_2$, and 1.5 to 10.0 mass % of a rare earth oxide or zirconium oxide.

11 Claims, No Drawings

POROUS MATERIAL, MANUFACTURING METHOD OF THE SAME, AND HONEYCOMB STRUCTURE

The present application is an application based on JP-2013-201811 filed with Japan Patent Office on Sep. 27, 2013, the entire contents of which are incorporated herein by reference.

BACKGROUND OF THE INVENTION

1. Field of the Invention

The present invention relates to a porous material, a manufacturing method of the porous material, and a honeycomb structure. More particularly, the present invention relates to a porous material having excellent thermal resistance and thermal shock resistance and having a broad firing temperature range, a manufacturing method of the porous material, and a honeycomb structure.

2. Description of Related Art

Heretofore, there has been reported a honeycomb structure having aggregates and "crystals containing one or more element selected from the group consisting of a rare earth, an alkaline earth, Al and Si" and having a structure in which the above aggregates are bonded to one another by these crystals (e.g., see Patent Document 1).

Furthermore, there has been reported a porous structure having aggregates and a bonding material to bond these aggregates to one another, wherein cordierite is used as the bonding material (e.g., see Patent Documents 2 to 4).

[Patent Document 1] JP 4464568
[Patent Document 2] WO 2009/69731
[Patent Document 3] JP 4082559
[Patent Document 4] JP 4227347

SUMMARY OF THE INVENTION

A honeycomb structure described in Patent Document 1 advantageously has an excellent bending strength, but from the viewpoints of thermal resistance and thermal shock resistance, there has been room for a further improvement.

A porous structure described in each of Patent Documents 2 to 4 has excellent thermal resistance and thermal shock resistance, but further enhancements of the thermal resistance and thermal shock resistance have been desired. Specifically, development of a porous material having a high bending strength and a high "bending strength/Young's modulus ratio" has been desired. Furthermore, there has been desired development of a porous material having a broad firing temperature range during firing when the porous material is manufactured.

The present invention has been developed to solve such a problem. That is, a main object is to provide a porous material having excellent thermal resistance and excellent thermal shock resistance and having a broad firing temperature range, a manufacturing method of the porous material, and a honeycomb structure.

To solve the abovementioned problem, according to the present invention, there are provided a porous material, a manufacturing method of the porous material, and a honeycomb structure as follows.

According to a first aspect of the present invention, a porous material containing aggregates is provided, and a bonding material which bonds the aggregates to one another in a state where pores are formed among the aggregates, wherein the bonding material contains crystalline cordierite, the bonding material further contains a rare earth element or a zirconium element, and a ratio of a mass of the bonding material to a total mass of the aggregates and the bonding material is from 12 to 45 mass %.

According to a second aspect of the present invention, the porous material according to the above first aspect is provided, wherein the bonding material contains, in the whole bonding material, 8.0 to 15.0 mass % of MgO, 30.0 to 60.0 mass % of $Al_2O_3$, 30.0 to 55.0 mass % of $SiO_2$, and 1.5 to 10.0 mass % of a rare earth oxide or zirconium oxide.

According to a third aspect of the present invention, the porous material according to the above first or second aspects is provided, wherein the rare earth element is at least one selected from the group consisting of yttrium, lanthanum, cerium, praseodymium, neodymium, samarium, europium, gadolinium, terbium, dysprosium, holmium, erbium, thulium, ytterbium and lutetium.

According to a fourth aspect of the present invention, the porous material according to any one of the above first to third aspects is provided, wherein the bonding material contains 50 mass % or more of crystalline cordierite in the whole bonding material.

According to a fifth aspect of the present invention, the porous material according to any one of the above first to fourth aspects is provided, wherein the aggregates are silicon carbide particles or silicon nitride particles.

According to a sixth aspect of the present invention, the porous material according to any one of the above first to fifth aspects is provided, wherein a porosity is from 35 to 75%.

According to a seventh aspect of the present invention, the porous material according to any one of the above first to sixth aspects is provided, wherein a bending strength is 10 MPa or more and a bending strength/Young's modulus ratio is $1.8 \times 10^{-3}$ or more.

According to an eighth aspect of the present invention, the porous material according to any one of the above first to seventh aspects is provided, wherein a thermal expansion coefficient is $4.0 \times 10^{-6}$/K or less.

According to a ninth aspect of the present invention, a manufacturing method of a porous material is provided, including: firing, at 1370 to 1450° C., a raw material for the porous material containing aggregate powder, and a raw material for a bonding material including a cordierite forming raw material and a rare earth element or a zirconium element, and containing 12 to 45 mass % of the raw material for the bonding material in a total mass of the aggregate powder and the raw material for the bonding material, to manufacture the porous material.

According to a tenth aspect of the present invention, a honeycomb structure which is constituted of the porous material according to any one of the above first to eighth aspects is provided, and includes partition walls defining a plurality of cells extending from a first end face which is one end face to a second end face which is the other end face.

According to an eleventh aspect of the present invention, the honeycomb structure according to the above tenth aspect is provided, which includes plugging portions disposed in open ends of the predetermined cells in the first end face and open ends of the residual cells in the second end face.

In a porous material of the present invention, a bonding material contains crystalline cordierite, this bonding material further contains a rare earth element or a zirconium element, and a ratio of a mass of the bonding material to a total mass of aggregates and the bonding material is in a predetermined range. Therefore, the porous material of the present invention has excellent thermal resistance and excellent thermal shock resistance, and has a broad firing temperature range.

In a manufacturing method of the porous material of the present invention, the porous material having the excellent thermal resistance and the excellent thermal shock resistance can be obtained by firing a raw material for a bonding material in a broad temperature range of 1370 to 1450° C., because the raw material for the bonding material contains a rare earth element or a zirconium element.

A honeycomb structure of the present invention is constituted of one embodiment of the porous material of the present invention. Therefore, the honeycomb structure of the present invention has excellent thermal resistance and excellent thermal shock resistance, and has a broad firing temperature range.

DETAILED DESCRIPTION OF THE PRESENT INVENTION

Hereinafter, embodiments of the present invention will specifically be described. The present invention is not limited to the following embodiments. It should be understood that the following embodiments, to which changes, improvements and the like are suitably added on the basis of ordinary knowledge of a person skilled in the art without departing from the gist of the present invention, also fall in the scope of the present invention.

(1) Porous Material

One embodiment of a porous material of the present invention contains aggregates and a bonding material which bonds the aggregates to one another in a state where pores are formed among the aggregates. The bonding material contains crystalline cordierite, and the bonding material further contains a rare earth element or a zirconium element. Furthermore, in the one embodiment of the porous material of the present invention, a ratio of a mass of the bonding material to a total mass of the aggregates and the bonding material is from 12 to 45 mass %.

In the porous material of the present embodiment, as described above, the bonding material contains "crystalline cordierite" and further contains the rare earth element or the zirconium element, and the ratio of the mass of the bonding material to the total mass of the aggregates and the bonding material is from 12 to 45 mass %. Therefore, the porous material of the present embodiment has a high bending strength, a high "bending strength/Young's modulus ratio", and the same degree of thermal expansion coefficient as in a conventional porous material. That is, it can be considered that the porous material of the present embodiment has excellent thermal resistance and excellent thermal shock resistance.

Furthermore, heretofore, it has been possible to obtain the porous material having the thermal resistance and thermal shock resistance when cordierite is used as the bonding material. On the other hand, there has been desired a porous material which is further excellent in "thermal resistance and thermal shock resistance". However, it has been difficult to obtain a porous material which is especially excellent in thermal resistance and thermal shock resistance, when a firing temperature range during firing in the manufacturing of the porous material is not accurately adjusted in a narrow range. This is because during the firing in a firing furnace, a temperature distribution is generated in the firing furnace (i.e., there are variances in firing temperature conditions), and a region where the firing temperature deviates from "a suitable temperature range" is generated in the firing furnace. On the other hand, in the porous material of the present embodiment, a predetermined ratio of the bonding material contains "crystalline cordierite" and further contains the rare earth element or the zirconium element, and hence a width of the above "suitable temperature range" during the firing broadens in the manufacturing. Therefore, the porous material of the present embodiment has the excellent thermal resistance and the excellent thermal shock resistance. It is to be noted that "the width of the above 'suitable temperature range' during the firing" is specifically from 1370 to 1450° C.

In the porous material of the present embodiment, examples of the aggregates include silicon carbide (SiC) particles, silicon nitride ($Si_3N_4$) particles, mullite ($Al_6Si_2O_{13}$) particles, and alumina ($Al_2O_3$) particles. In these aggregates, the silicon carbide (SiC) particles or silicon nitride ($Si_3N_4$) particles are preferable, and the silicon carbide (SiC) particles are more preferable.

The porous material of the present embodiment contains a predetermined ratio of the bonding material, and the bonding material contains "crystalline" cordierite and "the rare earth element or the zirconium element". In consequence, the porous material of the present embodiment has a high bending strength, a high "bending strength/Young's modulus ratio" and the same degree of thermal expansion coefficient as in the conventional porous material. On the other hand, when the bonding material contains "amorphous" cordierite in place of "crystalline" cordierite, the porous material has a lower bending strength, a lower "bending strength/Young's modulus ratio" and a larger thermal expansion coefficient than the bonding material containing "crystalline" cordierite. That is, cordierite to be contained in the bonding material is "crystalline cordierite", and "the rare earth element or the zirconium element" is further contained, so that it is possible to inhibit generation of defects such as cracks when thermal shock is added to the porous material.

A crystal phase of the bonding material in the porous material of the present embodiment can be identified by X-ray diffraction.

The bonding material contains preferably 50 mass % or more and more preferably 80 mass % or more of crystalline cordierite in the whole bonding material. When the ratio of the mass of crystalline cordierite to the whole bonding material is smaller than 50 mass %, the thermal resistance and thermal shock resistance cannot sufficiently be obtained sometimes. The ratio of the mass of crystalline cordierite to the whole bonding material is a value obtained by calculation from a ratio of a peak strength of each crystal phase obtained by the X-ray diffraction and a value measured by an after-mentioned method of inductively coupled plasma atomic emission spectrometry (ICP-AES).

In the porous material of the present embodiment, the bonding material which bonds the aggregates to one another further contains the rare earth element or the zirconium element.

The rare earth element is preferably at least one selected from the group consisting of yttrium, lanthanum, cerium, praseodymium, neodymium, samarium, europium, gadolinium, terbium, dysprosium, holmium, erbium, thulium, ytterbium and lutetium. Furthermore, the rare earth element is more preferably lanthanum, cerium, neodymium or gadolinium and especially preferably cerium.

The bonding material contains, in the whole bonding material, 8.0 to 15.0 mass % of MgO, 30.0 to 60.0 mass % of $Al_2O_3$, and 30.0 to 55.0 mass % of $SiO_2$. Furthermore, the bonding material contains, in the whole bonding material, preferably 1.5 to 10.0 mass %, further preferably 1.9 to 5.0 mass % and especially preferably 2.3 to 4.0 mass % of a rare earth oxide or zirconium oxide ($ZrO_2$). When the content of the rare earth oxide or the zirconium oxide is in such a range as described above, a firing temperature range advantageously broadens. When the content of the rare earth oxide or the zirconium oxide is smaller than 1.5 mass %, the firing temperature range does not sufficiently broaden. When the content is larger than 10.0 mass %, the rare earth oxide or zirconium oxide leaks from the bonding material sometimes. It is to be noted that when the rare earth element is cerium, the rare earth oxide is cerium oxide ($CeO_2$). The content (mass %) of each component in "the bonding material" is determined by the method of ICP-AES (Inductively Coupled Plasma Atomic Emission Spectrometry). Specifically, amounts of silicon (Si), aluminum (Al), magnesium (Mg), the rare earth, zirconium (Zr), carbon (C) and oxygen (O) are measured, respectively. Furthermore, an amount of silicon carbide (SiC) is calculated from the amount of carbon (C). Furthermore, it is considered that remaining (not included in silicon carbide (SiC)) silicon (Si) is silicon dioxide ($SiO_2$), and an amount of the silicon dioxide ($SiO_2$) is calculated. Furthermore, it is considered that aluminum (Al), magnesium (Mg), zirconium (Zr) and the rare earth are all oxides, and amounts of the oxides are calculated, respectively. Furthermore, there are determined the contents of the respective components ($SiO_2$, $Al_2O_3$, $MgO$, $ZrO_2$ and the rare earth oxide) in "the bonding material" to a total of the above $SiO_2$, $Al_2O_3$, $MgO$, $ZrO_2$ and the rare earth oxide. It is to be noted that a total mass of $SiO_2$, $Al_2O_3$, $MgO$, $ZrO_2$ and the rare earth oxide is a mass of "the bonding material".

In the porous material of the present embodiment, the ratio of the mass of the bonding material to the total mass of the aggregates and the bonding material is from 12 to 45 mass %. Furthermore, in the porous material of the present embodiment, the ratio of the mass of the bonding material to the total mass of the aggregates and the bonding material is preferably from 15 to 37 mass % and further preferably from 18 to 32 mass %. When the ratio of the mass of the bonding material to the total mass of the aggregates and the bonding material is smaller than 12 mass %, the bending strength lowers and "the bending strength/Young's modulus ratio" lowers, thereby deteriorating the thermal shock resistance. When the ratio of the mass of the bonding material to the total mass of the aggregates and the bonding material is in excess of 45 mass %, porosity is small. As an amount of the aggregates and an amount of the bonding material, values measured by the ICP-AES method are used. Specifically, the amount of silicon carbide (the aggregates) and the amount of "the bonding material" are preferably determined in the same manner as in the above "determination of the content (mass %) of each component in 'the bonding material'".

In the porous material of the present embodiment, the porosity is preferably from 35 to 75%, more preferably from 40 to 72%, and especially preferably from 50 to 70%. When the porosity is smaller than 35%, a pressure loss becomes large sometimes. Furthermore, when the porosity is in excess of 75%, the strength deteriorates sometimes. In the present specification, the porosity is a value calculated from a total pore volume (unit: $cm^3/g$) by a mercury porosimetry method (in conformity with JIS R 1655) and an apparent density (unit: $g/cm^3$) by an underwater Archimedes method. When the porosity is calculated, there is used an equation of "the porosity [%]=the total pore volume/{(1/the apparent density)+the total pore volume}×100". It is to be noted that the porosity can be regulated by, for example, an amount of a pore former for use in the manufacturing of the porous material, an amount of a sintering auxiliary agent, a firing atmosphere or the like. Furthermore, the porosity can be also regulated in accordance with a ratio between the aggregates and the bonding material.

In the porous material of the present embodiment, an average pore diameter is preferably from 8 to 32 μm, more preferably from 10 to 27 μm, and especially preferably from 12 to 23 μm. When the average pore diameter is smaller than 8 μm, the pressure loss becomes large sometimes. When the average pore diameter is in excess of 32 μm, a part of a particulate matter in an exhaust gas is not trapped but permeates a DPF or the like sometimes during use of the porous material of the present embodiment as the DPF or the like. In the present specification, the average pore diameter is a value measured by the mercury porosimetry method (in conformity with JIS R 1655).

In the porous material of the present embodiment, an average particle diameter of the aggregates is preferably from 8 to 52 μm, more preferably from 10 to 45 μm, and especially preferably from 13 to 35 μm. When the average particle diameter of the aggregates is smaller than 8 μm, a ratio of pores having small pore diameters is excessively large sometimes in a pore distribution of the porous material. When the average particle diameter of the aggregates is larger than 52 μm, clogging of a die is caused and a forming defect occurs sometimes during the forming of a honeycomb structure.

In the porous material of the present embodiment, the bending strength is preferably 10 MPa or more, and "a bending strength (Pa)/Young's modulus (Pa) ratio" is preferably $1.8 \times 10^{-3}$ or more. When the bending strength and the "the bending strength (Pa)/Young's modulus (Pa) ratio" are in the above ranges, the thermal shock resistance of the porous material enhances. When the bending strength is smaller than 10 MPa, the thermal shock resistance unfavorably deteriorates. It is to be noted that the higher bending strength is better, but an upper limit of the bending strength is about 50 MPa in a constitution of the porous material of the present embodiment. In the present specification, the bending strength is a value measured by "a bending test" in conformity with JIS R 1601. Furthermore, in the present specification, the Young's modulus is a value calculated from "a stress-strain curve" obtained in the abovementioned "bending test".

In the porous material of the present embodiment, a thermal expansion coefficient at 40 to 800° C. is preferably $4.0 \times 10^{-6}/K$ or less. Furthermore, the thermal expansion coefficient at 40 to 800° C. is further preferably $2.0 \times 10^{-6}/K$ or more and $3.8 \times 10^{-6}/K$ or less, and especially preferably $2.0 \times 10^{-6}/K$ or more and $3.6 \times 10^{-6}/K$ or less. When the thermal expansion coefficient at 40 to 800° C. is larger than $4.0 \times 10^{-6}/K$, the thermal shock resistance deteriorates sometimes. It is to be noted that the smaller thermal expansion coefficient is preferable, but a lower limit of the thermal expansion coefficient is $2.0 \times 10^{-6}/K$ in a constitution of the present invention. In the present specification, the thermal expansion coefficient is a value measured by a method in conformity with JIS R 1618. Specifically, a test piece of 3 vertical cells×3 horizontal cells×a length of 20 mm is cut out from the honeycomb structure, and the value of the thermal expansion coefficient is measured at 40 to 800° C. in an A-axis direction (a cell extending direction of the honeycomb structure).

(2) Honeycomb Structure

One embodiment of the honeycomb structure of the present invention is constituted of one embodiment of the abovementioned porous material of the present invention, and includes partition walls defining "a plurality of cells extending from a first end face, which is one end face, to a second end face which is the other end face". The honeycomb structure of the present embodiment is constituted of the abovementioned one embodiment of the porous material of the present invention, and hence the honeycomb structure has excellent thermal resistance and excellent thermal shock resistance and has a broad firing temperature range. The above cells become through channels of a fluid. Furthermore, the honeycomb structure is preferably a structure having a circumferential wall positioned in an outermost circumference. A thickness of the partition walls is preferably from 100 to 500 μm, more preferably from 125 to 400 μm, and especially preferably from 150 to 375 μm. A cell density is preferably from 15 to 77 cells/cm$^2$, more preferably from 20 to 62 cells/cm$^2$, and especially preferably from 23 to 54 cells/cm$^2$.

There is not any special restriction on a shape of the honeycomb structure, and examples of the shape include a cylindrical shape, and a tubular shape including a bottom surface having a polygonal shape (a triangular shape, a quadrangular shape, a pentangular shape, a hexagonal shape or the like).

There is not any special restriction on a shape of the cells of the honeycomb structure. Examples of a cell shape in a cross section perpendicular to the cell extending direction include a polygonal shape (a triangular shape, a quadrangular shape, a pentangular shape, a hexagonal shape, a heptagonal shape, an octagonal shape or the like), a circular shape, and any combination of these shapes.

A size of the honeycomb structure can suitably be determined in accordance with a use application. The honeycomb structure of the present invention is constituted of the porous material of the present invention, and therefore has excellent thermal resistance and excellent thermal shock resistance. Therefore, the size of the honeycomb structure can be large. Furthermore, the size of the honeycomb structure can be, for example, from about 10 cm$^3$ to 2.0×10$^4$ cm$^3$.

The honeycomb structure of the present invention can be used as the DPF or a catalyst carrier. Furthermore, a catalyst is also preferably loaded onto the DPF. When the honeycomb structure of the present invention is used as the DPF or the like, the following structure is preferable. That is, the honeycomb structure of the present invention includes plugging portions disposed in open ends of the predetermined cells in the first end face and open ends of the residual cells in the second end face. In both the end faces, the cells having the plugging portions and the cells, which do not have the plugging portions, are preferably alternately arranged, to form checkered patterns.

(3) Manufacturing Method of Porous Material

One embodiment of a manufacturing method of the porous material of the present invention will be described as follows.

The manufacturing method of the porous material of the present embodiment is a method of firing, at 1370 to 1450° C., a raw material for the porous material containing aggregate powder and a predetermined ratio of a raw material for a bonding material including a cordierite forming raw material and a rare earth element or a zirconium element, to manufacture the porous material.

In the manufacturing method of the porous material of the present embodiment, the raw material for the porous material containing "the predetermined ratio of the raw material for the bonding material including the cordierite forming raw material and further including the rare earth element or the zirconium element" is fired in the above temperature range, so that the porous material having the excellent thermal resistance and the excellent thermal shock resistance can be obtained.

Furthermore, in the manufacturing method of the porous material of the present embodiment, the raw material for the bonding material contains the rare earth element or the zirconium element, and hence the raw material is fired in a broad temperature range of 1370 to 1450° C., so that the porous material especially having the excellent thermal resistance and the excellent thermal shock resistance can be obtained. At this time, the bonding material becomes "crystalline" cordierite. It is to be noted that a case where "the raw material for the porous material is fired" includes a case where the raw material for the porous material is dried and then fired, or a case where the raw material for the porous material is dried, degreased and then fired.

In the manufacturing method of the porous material of the present embodiment, first, the aggregate powder and the above raw material for the bonding material are mixed, and to the mixture, a binder, a surfactant, a pore former, water and the like are added if necessary, thereby preparing the raw material for the porous material. The raw material for the bonding material is fired to become the bonding material.

The cordierite forming raw material in the raw material for the bonding material means a raw material which is fired to become cordierite. Specifically, the cordierite forming raw material is a ceramic raw material including "predetermined raw materials" mixed to obtain a chemical composition in which silica ($SiO_2$) is in a range of 42 to 56 mass %, alumina ($Al_2O_3$) is in a range of 30 to 45 mass %, and magnesia (MgO) is in a range of 12 to 16 mass %. Examples of "the predetermined raw materials" include talc, kaolin, an alumina source raw material, and silica. It is to be noted that examples of the alumina source raw material include aluminum oxide, aluminum hydroxide, boehmite and the like, and the alumina source raw material is a raw material oxidized by the firing, to form a part of cordierite.

The rare earth element is preferably at least one selected from the group consisting of yttrium, lanthanum, cerium, praseodymium, neodymium, samarium, europium, gadolinium, terbium, dysprosium, holmium, erbium, thulium, ytterbium and lutetium. Furthermore, the rare earth element is more preferably lanthanum, cerium, neodymium or gadolinium and especially preferably cerium.

There is not any special restriction on a raw material of the rare earth element or the zirconium element included in the raw material for the bonding material (i.e., "the raw material which becomes a rare earth element source" or "the raw material which becomes a zirconium element source"), but the raw material is preferably an oxygen-including powder raw material. An example of "the raw material which becomes the rare earth element source" is rare earth oxide powder. Specifically, when the rare earth element is cerium, the rare earth oxide is cerium oxide ($CeO_2$). Furthermore, an example of "the raw material which becomes the zirconium element source" is zirconium oxide powder.

In the raw material for the bonding material, contents (content ratios) of magnesium, aluminum, silicon, zirconium and the rare earth element preferably have such values as follows, respectively. It is to be noted that the contents (the content ratios) of magnesium, aluminum, silicon, zirconium and the rare earth element described in the following mean content ratios (mass %) of MgO, $Al_2O_3$, $SiO_2$, $ZrO_2$ and the rare earth oxide in terms of masses, respectively. For example, the content ratio in terms of MgO is the content ratio (mass %) of the MgO, when it is supposed that magnesium is all present as MgO. The raw material for the bonding material preferably contains 8.0 to 15.0 mass % of magnesium in terms of MgO, 30.0 to 60.0 mass % of aluminum in terms of $Al_2O_3$, and 30.0 to 55.0 mass % of silicon in terms of $SiO_2$. Furthermore, when the rare earth element is contained, 1.5 to 10.0 mass % of the rare earth element in terms of the rare earth oxide is preferably contained. Furthermore, when zirconium is contained, 1.5 to 10.0 mass % of zirconium in terms of zirconium oxide ($ZrO_2$) is preferably contained. Furthermore, the raw material for the bonding material preferably contains each raw material powder so that the contents of magnesium, aluminum, silicon, zirconium and the rare earth element are in the above ranges. It is to be noted that the above raw materials are not limited to powder raw materials and may be liquid raw materials. In the liquid raw materials, an example of a silicon source is colloidal silica or the like, and an example of the rare earth element source is an aqueous solution of a carbonate, a nitrate or the like.

Examples of the aggregate powder include silicon carbide (SiC) powder, silicon nitride ($Si_3N_4$) powder, mullite ($Al_6Si_2O_{13}$) powder, and alumina ($Al_2O_3$) powder. In these examples, the silicon carbide (SiC) powder and the silicon nitride ($Si_3N_4$) powder are preferable, and the silicon carbide (SiC) powder is more preferable.

An average particle diameter of the aggregate powder is preferably from 8 to 52 μm and more preferably from 10 to 45 μm. The average particle diameter of the aggregate powder is a value measured by a laser diffraction method.

The raw material for the porous material contains 12 to 45 mass % of the raw material for the bonding material in a total mass of the aggregate powder and the raw material for the bonding material. Furthermore, the raw material for the porous material contains preferably 15 to 37 mass % and more preferably 18 to 32 mass % of the raw material for the bonding material in the total mass of the aggregate powder and the raw material for the bonding material. The content ratio of the raw material for the bonding material is in the above range, whereby a ratio of a mass of the bonding material to a total mass of the aggregates and the bonding material in the porous material is in a range of 12 to 45 mass %. When the content ratio of the raw material for the bonding material is smaller than 12 mass %, the bending strength of the porous material to be obtained lowers and "the bending strength/Young's modulus ratio" lowers, thereby deteriorating the thermal shock resistance. When the content ratio of the raw material for the bonding material is in excess of 45 mass %, the porosity of the porous material to be obtained is small.

Examples of the binder include organic binders such as methylcellulose, hydroxypropoxyl cellulose, hydroxyethyl cellulose, hydroxypropylmethyl cellulose, carboxymethyl cellulose and polyvinyl alcohol. A content of the binder is preferably from 3 to 10 parts by mass to a total of 100 parts by mass of the aggregate powder and the raw material for the bonding material.

As the surfactant, ethylene glycol, dextrin, fatty acid soap, polyalcohol or the like can be used. One of these surfactants may be used alone or any combination of two or more of the surfactants may be used. A content of the surfactant is preferably 1 part by mass or less to the total of 100 parts by mass of the aggregate powder and the raw material for the bonding material.

There is not any special restriction on the pore former as long as the pore former is fired to become pores, and examples of the pore former include graphite, starch, resin balloons, a water absorbable resin, silica gel and the like. One of these pore formers may be used alone or any combination of two or more of the pore formers may be used. A content of the pore former is preferably 35 parts by mass or less to the total of 100 parts by mass of the aggregate powder and the raw material for the bonding material. An average particle diameter of the pore former is preferably from 10 to 70 μm. When the average particle diameter is smaller than 10 μm, the pores cannot sufficiently be formed sometimes. When the average particle diameter is larger than 70 μm, a part of the particulate matter in the exhaust gas is not trapped, but permeates a DPF or the like sometimes during the use of the porous material of the present embodiment as the DPF or the like. The average particle diameter of the pore former is a value measured by a laser diffraction method. It is to be noted that when the pore former is the water absorbable resin, the average particle diameter is a value after water is absorbed.

A content of the water is preferably from 15 to 35 parts by mass to the total of 100 parts by mass of the aggregate powder and the raw material for the bonding material. For example, when the porous material is formed into a honeycomb shape and then fired (when the honeycomb structure is prepared), the content of the water is preferably suitably regulated so that a hardness of the porous material (a hardness of a kneaded material) during the forming into the honeycomb shape is such hardness as to facilitate the forming.

Next, the raw material for the porous material is preferably formed into a desirable shape. There is not any special restriction on the shape to be formed or a forming method, and the shape and the method can suitably be determined in accordance with the use application.

Next, the raw material for the porous material (a resultant formed body in a case where the raw material for the porous material is formed into a specific shape) is preferably dried. There is not any special restriction on a drying method, and examples of the method include electromagnetic heating systems such as microwave heating drying and high-frequency dielectric heating drying, and external heating systems such as hot air drying and superheated steam drying. In these methods, it is preferable that a predetermined amount of water content is dried by the electromagnetic heating system and then the remaining water content is dried by the external heating system, because the whole formed body can rapidly and evenly be dried so that any cracks are not generated. As drying conditions, it is preferable that 6 to 25 mass % of water content is removed from an amount of the water content prior to the drying by the electromagnetic heating system and then the water content is reduced to 2 mass % or less by the external heating system. As the electromagnetic heating system, the dielectric heating drying is preferable, and as the external heating system, the hot air drying is preferable.

Next, the raw material for the porous material (the dried raw material for the porous material in a case where the drying is performed) is fired to prepare the porous material. Prior to the firing (main firing), calcinating (degreasing) is preferably performed to remove the binder and the like. The calcinating is preferably performed at 200 to 600° C. in the air atmosphere for 0.5 to 20 hours.

In the manufacturing method of the porous material of the present embodiment, a firing temperature can be in a broad temperature range of 1370 to 1450° C. When the firing temperature is in the range of 1370 to 1450° C., the cordierite forming raw material softens and comes into contact closely with the aggregates, so that "crystalline" cordierite is formed in the bonding material. When the "crystalline" cordierite is formed and "the rare earth element or the zirconium element" is further contained in the bonding material as described above, a high bending strength is developed. On the other hand, when the firing temperature is in excess of 1450° C., "amorphous" cordierite is formed in the bonding material (in other words, cordierite becomes amorphous). When cordierite becomes amorphous in this manner, the bonding material has a lower bending strength, a lower "bending strength/Young's modulus ratio" and a larger thermal expansion coefficient than the bonding material containing the "crystalline" cordierite. When the firing temperature is lower than 1370° C., the aggregates are not sufficiently bonded by the bonding material, thereby deteriorating the strength.

The atmosphere during the firing is preferably a non-oxidizing atmosphere of nitrogen, argon or the like, or an atmosphere where an oxygen partial pressure is 10% or less. Furthermore, the firing is preferably performed at ordinary pressure. Furthermore, a firing time is preferably from 1 to 20 hours. It is to be noted that the calcinating and the firing can be performed by using, for example, an electric furnace, a gas furnace or the like.

According to the one embodiment of the manufacturing method of the porous material of the present invention, the above one embodiment of the porous material of the present invention can be obtained.

(4) Manufacturing Method of Honeycomb Structure

A manufacturing method of the one embodiment of the honeycomb structure of the present invention will be described.

The manufacturing method of the one embodiment of the honeycomb structure of the present invention described in the following is a method in which in the above "manufacturing method of the porous material" of the present invention, the raw material for the porous material is formed into the honeycomb shape and then fired to obtain a honeycomb structure porous material (the honeycomb structure). That is, it can be considered that the manufacturing method of the one embodiment of the honeycomb structure of the present invention is one aspect of the above manufacturing method of the porous material of the present invention. Therefore, the manufacturing method of the one embodiment of the honeycomb structure of the present invention includes firing, in a predetermined temperature range, the raw material for the porous material containing "the predetermined ratio of the raw material for the bonding material including the cordierite forming raw material and further including the rare earth element or the zirconium element". As described above, it is possible to obtain the honeycomb structure having excellent thermal resistance and excellent thermal shock resistance. Furthermore, in the manufacturing method of the one embodiment of the honeycomb structure of the present invention, the raw material for the bonding material contains the rare earth element or the zirconium element, and hence the raw material is fired in a broader temperature range of 1370 to 1450° C., so that the porous material especially having excellent thermal resistance and excellent thermal shock resistance can be obtained. At this time, the bonding material includes the "crystalline" cordierite.

In the manufacturing method of the one embodiment of the honeycomb structure of the present invention, first, the raw material for the porous material is preferably prepared by a method similar to the above one embodiment of "the manufacturing method of the porous material" of the present invention.

Furthermore, the obtained raw material for the porous material is preferably kneaded to form the kneaded material. There is not any special restriction on a method of kneading the raw material for the porous material to form the kneaded material, and an example of the method is a method in which a kneader, a vacuum pugmill or the like is used.

Next, the kneaded material is extruded to form a honeycomb formed body (the raw material for the porous material of the honeycomb shape). In the extrusion, a die having desirable whole shape, cell shape, partition wall thickness, cell density and the like is preferably used. A material of the die is preferably cemented carbide which does not easily wear away. The honeycomb formed body is a structure having porous partition walls defining a plurality of cells which become through channels of a fluid and a circumferential wall positioned in an outermost circumference. The partition wall thickness, cell density, circumferential wall thickness and the like of the honeycomb formed body can suitably be determined in accordance with the structure of the honeycomb structure to be prepared, in consideration of shrinkages during the drying and the firing.

The honeycomb formed body obtained in this manner is preferably dried prior to the firing. There is not any special restriction on a drying method, and examples of the method include electromagnetic heating systems such as microwave heating drying and high-frequency dielectric heating drying, and external heating systems such as hot air drying and superheated steam drying. In these methods, it is preferable that a predetermined amount of water content is dried by the electromagnetic heating system and then the remaining water content is dried by the external heating system, because the whole formed body can rapidly and evenly be dried so that any cracks are not generated. As drying conditions, it is preferable that 40 to 70 mass % of water content is removed from an amount of the water content prior to the drying by the electromagnetic heating system and then the water content is reduced to 2 mass % or less by the external heating system. As the electromagnetic heating system, the dielectric heating drying is preferable, and as the external heating system, the hot air drying is preferable.

Next, when a length of the honeycomb formed body in a cell extending direction is not a desirable length, both end faces (both end portions) are preferably cut to obtain the desirable length. There is not any special restriction on a cutting method, but an example of the method is a method in which a round saw cutter or the like is used.

Next, the honeycomb formed body is fired to prepare the honeycomb structure. Prior to the firing, the calcinating is preferably performed to remove the binder and the like. As calcinating conditions, heating is preferably performed at 200 to 600° C. in the air atmosphere for 0.5 to 20 hours. A firing temperature is from 1370 to 1450° C.

The atmosphere during the firing is preferably a non-oxidizing atmosphere of nitrogen, argon or the like, or an atmosphere where an oxygen partial pressure is 10% or less. Furthermore, the firing is preferably performed at ordinary pressure. Furthermore, a firing time is preferably from 1 to 20 hours. It is to be noted that the calcinating and the firing can be performed by using, for example, an electric furnace or a gas furnace and the like.

EXAMPLES

Hereinafter, the present invention will further specifically be described in accordance with examples, but the present invention is not limited to these examples.

Example 1

Silicon carbide (SiC) powder and a raw material (powder) for a bonding material were mixed at a ratio (a mass ratio) of 75:25 to prepare "mixed powder". As the raw material for the bonding material, there was used powder containing 7.8 mass % of talc, 10.0 mass % of alumina, and 12.9 mass % of colloidal silica as cordierite forming raw materials, and containing 2.7 mass % of cerium oxide ($CeO_2$) as a rare earth oxide. Furthermore, to the above "mixed powder", hydroxypropyl methylcellulose was added as a binder, starch and a water absorbable resin were added as pore formers, and water was also added to obtain a raw material for a porous material (a forming raw material). A content of the binder was 7 parts by mass, when a content of the mixed powder was 100 parts by mass. A content of the pore former was 26 parts by mass, when the content of the mixed powder was 100 parts by mass. A content of the water was 35 parts by mass, when the content of the mixed powder was 100 parts by mass. An average particle diameter of the silicon carbide powder was 18 µm. Furthermore, an average particle diameter of the pore former, i.e., each of the starch and the water absorbable resin was 30

μm. Additionally, the average particle diameters of the silicon carbide powder and the pore former are values measured by a laser diffraction method.

Next, the forming raw material was kneaded by a pugmill to prepare a columnar kneaded material. Then, the obtained columnar kneaded material was formed into a honeycomb shape by use of an extrusion machine, to obtain a honeycomb formed body (the raw material for the porous material formed into the honeycomb shape). The obtained honeycomb formed body was dried by microwaves and then dried at 120° C. for two hours by use of a hot air dryer, to obtain a honeycomb dried body.

The obtained honeycomb dried body was degreased at 450° C. in the air atmosphere for one hour, and then fired at 1370° C. in an Ar inert atmosphere for two hours to obtain the porous material of a honeycomb structure (the honeycomb structure). Additionally, it can be considered that the above honeycomb fired body is the porous material.

In the obtained honeycomb structure, a thickness of partition walls was 300 μm and a cell density was 46 cells/cm$^2$. Furthermore, a bottom surface of the honeycomb structure had a quadrangular shape whose one side was 36.2 mm, and a length of the honeycomb structure in a cell extending direction was 152 mm.

By an after-mentioned method (identification of each component), silicon carbide, MgO, $Al_2O_3$, $SiO_2$ and $CeO_2$ to be contained in the honeycomb structure (the porous material) were identified. In consequence, it was confirmed that the honeycomb structure included silicon carbide, MgO, $Al_2O_3$, $SiO_2$ and $CeO_2$. A content of MgO in the bonding material was 9.8 mass %. Furthermore, a content of $Al_2O_3$ in the bonding material was 42.4 mass %. Furthermore, a content of $SiO_2$ in the bonding material was 46.2 mass %. Furthermore, a content of $CeO_2$ in the bonding material was 1.6 mass %. Furthermore, to a total mass of silicon carbide and the bonding material, a ratio of a mass of silicon carbide was 75.0 mass % and a ratio of a mass of the bonding material was 25.0 mass %.

In the obtained porous material of the honeycomb structure (the honeycomb structure), a porosity was 64.9% and an average pore diameter was 18.4 μm. Furthermore, in the honeycomb structure, a bending strength was 10.5 MPa, a Young's modulus was 4.7 GPa, and "a bending strength/Young's modulus ratio" (represented by "bending strength/Young's modulus" in Table 1) was $2.2 \times 10^{-3}$. Furthermore, a thermal expansion coefficient of the honeycomb structure (at 40 to 800° C.) was $3.6 \times 10^{-6}$ K$^{-1}$ (represented by "3.6 ppm/K" in Table 1). The obtained results are shown in Table 1. It is to be noted that respective measured values are values obtained by methods described as follows.

In Tables 1 and 2, a column of "$CeO_2$" indicates a mass ratio (mass %) of $CeO_2$ to a mass of the whole bonding material. Furthermore, a column of "$ZrO_2$" indicates a mass ratio (mass %) of $ZrO_2$ to the mass of the whole bonding material. Furthermore, columns of "porosity" and "average pore diameter" indicate the porosity and average pore diameter of the porous material. Furthermore, columns of "bending strength", "Young's modulus" and "thermal expansion coefficient" indicate the bending strength, Young's modulus and thermal expansion coefficient of the porous material. Furthermore, a column of "bending strength/Young's modulus ratio" indicates a value obtained by dividing the bending strength (Pa) by the Young's modulus (Pa).

Furthermore, in Tables 1 and 2, in a column of "general evaluation", "A" is optimum, "B" is suitable, "C" is passable, and "D" is unsuitable. Specifically, when the bending strength is in excess of 10 MPa, the bending strength/Young's modulus ratio is in excess of $2.5 \times 10^{-3}$ and the thermal expansion coefficient is smaller than 3.7 ppm/K, the evaluation is "A (optimum)". Furthermore, when the bending strength is in excess of 10 MPa and the bending strength/Young's modulus ratio is in excess of $2 \times 10^{-3}$ and $2.5 \times 10^{-3}$ or less or the thermal expansion coefficient is from 3.7 to 4 ppm/K, the evaluation is "B (suitable)". Furthermore, when the thermal expansion coefficient is 4 ppm/K or less and the bending strength is from 8 to 10 MPa or the bending strength/Young's modulus ratio is from 1.8 to $2 \times 10^{-3}$, the evaluation is "C (passable)". Furthermore, when the bending strength is smaller than 8 MPa, the bending strength/Young's modulus ratio is smaller than $1.8 \times 10^{-3}$ or the thermal expansion coefficient is in excess of 4 ppm/K, the evaluation is "D (unsuitable)".

(Identification of Each Component)

The identification of each component in the porous material is performed on the basis of results of qualitative analysis by EPMA (Electron Probe Micro Analyzer) and element mapping. A content of each component is determined by a method of ICP-AES (Inductively Coupled Plasma Atomic Emission Spectrometry). Specifically, amounts of silicon (Si), aluminum (Al), magnesium (Mg), a rare earth, zirconium (Zr), carbon (C) and oxygen (O) are respectively measured. Then, an amount of silicon carbide (SiC) is calculated from the amount of carbon (C). Furthermore, it is considered that remaining (not included in silicon carbide (SiC)) silicon (Si) is silicon dioxide ($SiO_2$), and an amount of the silicon dioxide ($SiO_2$) is calculated. Furthermore, it is considered that aluminum (Al), magnesium (Mg), zirconium (Zr) and the rare earth are all oxides, and amounts of the oxides are calculated, respectively. Furthermore, there are calculated contents of the respective components ($SiO_2$, $Al_2O_3$, MgO, $ZrO_2$ and the rare earth oxide) in "the bonding material" to the total of the above $SiO_2$, $Al_2O_3$, MgO, $ZrO_2$ and rare earth oxide.

(Identification of Crystal Phase)

The identification of a crystal phase is performed (i.e., it is confirmed that cordierite contained in the bonding material is "crystalline") by powder X-ray diffraction. That is, by the powder X-ray diffraction, it is confirmed whether cordierite is crystalline or amorphous. Furthermore, presence of a heterogeneous phase (mullite) is also confirmed.

(Mass Ratio of Crystalline Cordierite)

A ratio of a mass of crystalline cordierite to the whole bonding material is obtained by calculation from a ratio of a peak strength of each crystal phase obtained by the above X-ray diffraction and a value measured by the above method of inductively coupled plasma atomic emission spectrometry (ICP-AES).

(Porosity)

Porosity is calculated from a total pore volume [cm$^3$/g] by a mercury porosimetry method (in conformity with JIS R 1655) and an apparent density [g/cm$^3$] by an underwater Archimedes method. When the porosity is calculated, there is used an equation of "an open porosity (%)=100×the total pore volume/{(1/the apparent density)+the total pore volume}". It is to be noted that in the present specification, "the porosity" means "the open porosity". The open porosity is the porosity concerning "pores opened in the surface of the porous material".

(Average Pore Diameter)

The average pore diameter is measured by the mercury porosimetry method (in conformity with JIS R 1655).

(Bending Strength (Strength))

There is processed a test piece (a thickness of 0.3 mm×a horizontal size of 4 mm×a length of 40 mm) having, as a longitudinal direction, a direction in which the cells pass through the honeycomb structure, and the bending strength of the material is calculated by "a bending test" in conformity with JIS R 1601.

(Young's Modulus)

From "a stress-strain curve" obtained by the above "bending strength" test, "a tilt" of the curve is calculated and the obtained "tilt" is the Young's modulus.

(Thermal Expansion Coefficient)

An average linear thermal expansion coefficient (the thermal expansion coefficient) at 40 to 800° C. is measured in conformity with JIS R 1618.

Additionally, in Examples 1 to 4, types and blend amounts of raw materials were the same and a firing temperature was changed (the firing temperatures: 1370° C., 1390° C., 1410° C., and 1440° C.). Similarly, in respective example groups of Examples 5 to 8, Examples 9 to 12, Examples 13 to 16, Examples 17 to 20 and Examples 21 to 24, types and blend amounts of raw materials were the same and a firing temperature was changed. Furthermore, when "cordierite" is simply described in a column of "bonding phase" in Table 1, "crystalline cordierite" is meant. Furthermore, in the column of "bonding phase" in Table 1, a "ratio" means "a ratio of a mass of 'crystalline cordierite' to the whole bonding material".

TABLE 1

| | Aggregates | Ratios of aggregates and bonding material | | Bonding material composition | | | | | Firing | Bonding phase | |
|---|---|---|---|---|---|---|---|---|---|---|---|
| | Type of aggregates | Aggregates Mass % | Bonding material Mass % | MgO Mass % | $Al_2O_3$ Mass % | $SiO_2$ Mass % | $CeO_2$ Mass % | $ZrO_2$ Mass % | temp. ° C. | Contained substance | Ratio Mass % |
| Example 1 | SiC | 75.0 | 25.0 | 9.8 | 42.4 | 46.2 | 1.6 | — | 1370 | Cordierite | 90 |
| Example 2 | SiC | 75.0 | 25.0 | 9.8 | 42.4 | 46.2 | 1.6 | — | 1390 | Cordierite | 90 |
| Example 3 | SiC | 75.0 | 25.0 | 9.8 | 42.4 | 46.2 | 1.6 | — | 1410 | Cordierite | 90 |
| Example 4 | SiC | 75.0 | 25.0 | 9.8 | 42.4 | 46.2 | 1.6 | — | 1440 | Cordierite, Mullite | 85 |
| Example 5 | SiC | 75.0 | 25.0 | 9.7 | 41.9 | 45.6 | 2.7 | — | 1370 | Cordierite | 90 |
| Example 6 | SiC | 75.0 | 25.0 | 9.7 | 41.9 | 45.6 | 2.7 | — | 1390 | Cordierite | 90 |
| Example 7 | SiC | 75.0 | 25.0 | 9.7 | 41.9 | 45.6 | 2.7 | — | 1410 | Cordierite | 90 |
| Example 8 | SiC | 75.0 | 25.0 | 9.7 | 41.9 | 45.6 | 2.7 | — | 1440 | Cordierite, Mullite | 85 |
| Example 9 | SiC | 75.0 | 25.0 | 9.5 | 40.8 | 44.4 | 5.3 | — | 1370 | Cordierite | 90 |
| Example 10 | SiC | 75.0 | 25.0 | 9.5 | 40.8 | 44.4 | 5.3 | — | 1390 | Cordierite | 90 |
| Example 11 | SiC | 75.0 | 25.0 | 9.5 | 40.8 | 44.4 | 5.3 | — | 1410 | Cordierite | 90 |
| Example 12 | SiC | 75.0 | 25.0 | 9.5 | 40.8 | 44.4 | 5.3 | — | 1440 | Cordierite, Mullite | 85 |
| Example 13 | SiC | 75.0 | 25.0 | 9.8 | 42.4 | 46.2 | — | 1.6 | 1370 | Cordierite | 90 |
| Example 14 | SiC | 75.0 | 25.0 | 9.8 | 42.4 | 46.2 | — | 1.6 | 1390 | Cordierite | 90 |
| Example 15 | SiC | 75.0 | 25.0 | 9.8 | 42.4 | 46.2 | — | 1.6 | 1410 | Cordierite | 90 |
| Example 16 | SiC | 75.0 | 25.0 | 9.8 | 42.4 | 46.2 | — | 1.6 | 1440 | Cordierite, Mullite | 85 |
| Example 17 | SiC | 75.0 | 25.0 | 9.7 | 41.9 | 45.6 | — | 2.7 | 1370 | Cordierite | 90 |
| Example 18 | SiC | 75.0 | 25.0 | 9.7 | 41.9 | 45.6 | — | 2.7 | 1390 | Cordierite | 90 |
| Example 19 | SiC | 75.0 | 25.0 | 9.7 | 41.9 | 45.6 | — | 2.7 | 1410 | Cordierite | 90 |
| Example 20 | SiC | 75.0 | 25.0 | 9.7 | 41.9 | 45.6 | — | 2.7 | 1440 | Cordierite, Mullite | 85 |

| | Material physical property values | | | | | | |
|---|---|---|---|---|---|---|---|
| | Porosity % | Average. pore diameter μm | Bending strength MPa | Young's modulus GPa | Bending strength/Young's modulus ($\times 10^{-3}$) | Thermal expansion coefficient ppm/K | General evaluation |
| Example 1 | 64.9 | 18.4 | 10.5 | 4.0 | 2.6 | 3.6 | A |
| Example 2 | 65.2 | 18.8 | 10.3 | 3.8 | 2.7 | 3.5 | A |
| Example 3 | 65.0 | 19.1 | 10.5 | 3.5 | 3.0 | 3.6 | A |
| Example 4 | 64.8 | 19.5 | 10.4 | 3.3 | 3.2 | 3.6 | A |
| Example 5 | 66.1 | 19.5 | 10.5 | 4.1 | 2.6 | 3.5 | A |
| Example 6 | 65.4 | 19.5 | 10.6 | 3.8 | 2.8 | 3.5 | A |
| Example 7 | 65.5 | 19.6 | 10.5 | 3.5 | 3.0 | 3.6 | A |
| Example 8 | 65.1 | 20.6 | 10.4 | 3.3 | 3.2 | 3.6 | A |
| Example 9 | 65.0 | 20.0 | 11.0 | 4.0 | 2.8 | 3.6 | A |
| Example 10 | 65.0 | 20.0 | 11.2 | 4.2 | 2.7 | 3.6 | A |
| Example 11 | 64.1 | 19.2 | 10.8 | 4.1 | 2.6 | 3.6 | A |
| Example 12 | 64.3 | 19.9 | 11.9 | 4.0 | 3.0 | 3.8 | B |
| Example 13 | 66.0 | 18.5 | 10.3 | 3.2 | 3.2 | 3.6 | A |
| Example 14 | 66.7 | 18.9 | 10.2 | 3.0 | 3.4 | 3.6 | A |
| Example 15 | 66.2 | 19.4 | 10.1 | 2.7 | 3.7 | 3.6 | A |
| Example 16 | 65.2 | 17.8 | 11.2 | 3.3 | 3.4 | 3.6 | A |
| Example 17 | 67.5 | 18.4 | 10.1 | 4.5 | 2.2 | 3.5 | B |
| Example 18 | 66.7 | 18.3 | 10.2 | 4.5 | 2.3 | 3.8 | B |
| Example 19 | 66.3 | 18.7 | 11.0 | 4.3 | 2.6 | 3.6 | A |
| Example 20 | 64.8 | 20.3 | 12.8 | 5.0 | 2.6 | 3.6 | A |

TABLE 2

| | Aggregates | Ratios of aggregates and bonding material | | Bonding material composition | | | | | Firing temp. °C | Bonding phase | | Material physical property values | | | | | |
|---|---|---|---|---|---|---|---|---|---|---|---|---|---|---|---|---|---|
| | Type of aggregates | Aggregates Mass % | Bonding material Mass % | MgO Mass % | Al₂O₃ Mass % | SiO₂ Mass % | CeO₂ Mass % | ZrO₂ Mass % | | Contained substance | Ratio Mass % | Porosity % | Average pore diameter μm | Bending strength MPa | Young's modulus GPa | Bending strength/Young's modulus (×10⁻³) | Thermal expansion coefficient ppm/K | General evaluation |
| Example 21 | SiC | 75.0 | 25.0 | 9.5 | 40.8 | 44.4 | — | 5.3 | 1370 | Cordierite | 90 | 65.0 | 20.0 | 10.5 | 4.0 | 2.6 | 3.6 | A |
| Example 22 | SiC | 75.0 | 25.0 | 9.5 | 40.8 | 44.4 | — | 5.3 | 1390 | Cordierite | 90 | 65.2 | 20.0 | 10.6 | 4.1 | 2.6 | 3.6 | A |
| Example 23 | SiC | 75.0 | 25.0 | 9.5 | 40.8 | 44.4 | — | 5.3 | 1410 | Cordierite | 90 | 64.5 | 19.2 | 10.8 | 4.1 | 2.6 | 3.8 | B |
| Example 24 | SiC | 75.0 | 25.0 | 9.5 | 40.8 | 44.4 | — | 5.3 | 1440 | Cordierite, Mullite | 85 | 64.3 | 19.9 | 11.9 | 4.0 | 3.0 | 3.8 | B |
| Example 25 | SiC | 70.0 | 30.0 | 9.7 | 41.9 | 45.6 | 2.7 | — | 1390 | Cordierite | 90 | 65.1 | 19.1 | 10.6 | 3.9 | 2.7 | 3.6 | A |
| Example 26 | SiC | 65.0 | 35.0 | 9.7 | 41.9 | 45.6 | 2.7 | — | 1390 | Cordierite | 90 | 64.7 | 18.7 | 11.2 | 4.0 | 2.8 | 3.6 | A |
| Example 27 | SiC | 80.0 | 20.0 | 9.7 | 41.9 | 45.6 | 2.7 | — | 1390 | Cordierite | 90 | 64.2 | 19.8 | 11.6 | 3.7 | 3.1 | 3.6 | A |
| Example 28 | SiC | 85.0 | 15.0 | 9.7 | 41.9 | 45.6 | 2.7 | — | 1390 | Cordierite | 90 | 66.0 | 20.2 | 10.5 | 3.5 | 3.0 | 3.8 | B |
| Example 29 | SiC | 75.0 | 25.0 | 9.7 | 41.9 | 45.6 | 2.7 | — | 1390 | Cordierite | 90 | 37.0 | 20.0 | 35 | 17 | 2.1 | 3.7 | B |
| Example 30 | SiC | 75.0 | 25.0 | 14.6 | 35.2 | 50.2 | 2.7 | — | 1390 | Cordierite | 95 | 64.6 | 19.6 | 10.2 | 3.8 | 2.7 | 3.3 | A |
| Example 31 | SiC | 75.0 | 25.0 | 8.8 | 49.9 | 41.3 | 2.7 | — | 1390 | Cordierite | 85 | 65.9 | 19.2 | 10.1 | 3.7 | 2.7 | 3.5 | A |
| Example 32 | Si₃N₄ | 75.0 | 25.0 | 9.7 | 41.9 | 45.6 | — | 2.7 | 1390 | Cordierite | 90 | 65.2 | 19.4 | 10.4 | 3.6 | 2.9 | 3.2 | A |
| Example 33 | Si₃N₄ | 75.0 | 25.0 | 9.7 | 41.9 | 45.6 | 2.7 | — | 1390 | Cordierite | 90 | 65.1 | 19.1 | 10.1 | 3.5 | 2.9 | 3.2 | A |
| Example 34 | SiC | 55.0 | 45.0 | 9.7 | 41.9 | 45.6 | 2.7 | — | 1390 | Cordierite | 90 | 60.0 | 16.0 | 12.0 | 5.0 | 2.4 | 3.5 | B |
| Example 35 | SiC | 88.0 | 12.0 | 9.7 | 41.9 | 45.6 | 2.7 | — | 1390 | Cordierite | 90 | 66.6 | 20.4 | 10.2 | 4.5 | 2.3 | 3.9 | B |
| Example 36 | SiC | 75.0 | 25.0 | 8.5 | 51.0 | 38.0 | 2.7 | — | 1390 | Cordierite, Mullite | 65 | 65.0 | 18.5 | 10.6 | 4.4 | 2.4 | 3.9 | B |
| Example 37 | SiC | 75.0 | 25.0 | 9.1 | 39.2 | 42.6 | 9.1 | — | 1390 | Cordierite | 75 | 64.0 | 19.5 | 11.0 | 5.0 | 2.2 | 3.8 | B |
| Example 38 | SiC | 75.0 | 25.0 | 8.9 | 38.5 | 41.9 | 10.7 | — | 1390 | Cordierite, Ceria | 70 | 63.0 | 18.0 | 11.5 | 6.0 | 1.9 | 3.8 | C |
| Example 39 | SiC | 75.0 | 25.0 | 9.9 | 42.7 | 46.4 | 1.0 | — | 1390 | Cordierite | 90 | 65.4 | 19.5 | 8.5 | 4.1 | 2.1 | 3.5 | C |
| Example 40 | SiC | 75.0 | 25.0 | 9.1 | 39.2 | 42.6 | — | 9.5 | 1390 | Cordierite | 75 | 63.5 | 19.5 | 11.0 | 5.0 | 2.2 | 3.8 | B |
| Example 41 | SiC | 75.0 | 25.0 | 8.9 | 38.5 | 41.9 | — | 10.5 | 1390 | Cordierite, Zirconia | 70 | 61.0 | 16.0 | 12.0 | 6.7 | 1.8 | 3.8 | C |
| Example 42 | SiC | 75.0 | 25.0 | 9.9 | 42.7 | 46.4 | — | 1.0 | 1390 | Cordierite | 90 | 65.1 | 19.1 | 8.0 | 4.3 | 1.9 | 3.5 | C |
| Comparative Example 1 | SiC | 75.0 | 25.0 | 10.0 | 43.1 | 46.9 | — | — | 1370 | Cordierite | 90 | 65.4 | 17.7 | 7.0 | 4.6 | 1.5 | 3.6 | D |
| Comparative Example 2 | SiC | 75.0 | 25.0 | 10.0 | 43.1 | 46.9 | — | — | 1390 | Cordierite | 90 | 65.5 | 19.7 | 7.5 | 4.3 | 1.7 | 3.5 | D |
| Comparative Example 3 | SiC | 75.0 | 25.0 | 10.0 | 43.1 | 46.9 | — | — | 1410 | Cordierite, Mullite | 85 | 65.3 | 20.1 | 7.5 | 4.4 | 1.7 | 3.5 | D |
| Comparative Example 4 | SiC | 75.0 | 25.0 | 10.0 | 43.1 | 46.9 | — | — | 1440 | Cordierite, Mullite | | 65.0 | 19.4 | 8.0 | 4.6 | 1.7 | 3.5 | D |
| Comparative Example 5 | SiC | 90.0 | 10.0 | 10.0 | 43.1 | 46.9 | — | — | 1470 | Amorphous cordierite | — | 67.0 | 20.3 | 7.5 | 5.0 | 1.5 | 4.2 | D |
| Comparative Example 6 | SiC | 90.0 | 10.0 | 9.7 | 41.9 | 45.6 | 2.7 | — | 1470 | Amorphous cordierite | — | 65.6 | 21.0 | 9.0 | 5.1 | 1.8 | 4.3 | D |
| Comparative Example 7 | SiC | 53.0 | 47.0 | 9.7 | 41.9 | 45.6 | 2.7 | — | 1390 | Cordierite | 90 | 55.0 | 13.0 | 15.0 | 9.0 | 1.7 | 3.2 | D |

Examples 2 to 42 and Comparative Examples 1 to 7

The procedures of Example 1 were repeated except that respective conditions were as shown in Tables 1 and 2, to prepare porous materials (honeycomb structures). Respective evaluations were performed similarly to Example 1. The results are shown in Tables 1 and 2. A porosity of each porous material was adjusted by suitably changing an amount of a pore former.

It is seen from Tables 1 and 2 that the porous materials of Examples 1 to 42 have a higher strength and a larger bending strength/Young's modulus ratio than the porous materials of Comparative Examples 1 to 7, have the same degree of thermal expansion coefficient as in the porous materials of Comparative Examples 1 to 7, and have excellent thermal resistance and excellent thermal shock resistance. Furthermore, the porous materials obtained in Examples 1 to 42 have a high strength and a large bending strength/Young's modulus ratio in a broad firing temperature range (1370 to 1440° C.), and have the same degree of thermal expansion coefficient as in the porous materials of Comparative Examples 1 to 7.

A porous material of the present invention can be utilized as a material for a catalyst carrier, a material for a DPF or the like. A honeycomb structure of the present invention can be utilized as the catalyst carrier, the DPF or the like.

What is claimed is:

1. A porous material containing aggregates, and a bonding material which bonds the aggregates to one another in a state where pores are formed among the aggregates,
    wherein the bonding material contains crystalline cordierite,
    the bonding material further contains a rare earth oxide or a zirconium oxide in an amount of 1.5 to 10.0 mass %,
    a ratio of a mass of the bonding material to a total mass of the aggregates and the bonding material is from 12 to 45 mass %; and
    a bending strength is 10 MPa or more and a bending strength/Young's modulus ratio is $1.8 \times 10^{-3}$ or more.

2. The porous material according to claim 1,
    wherein the bonding material contains, in the whole bonding material, 8.0 to 15.0 mass % of MgO, 30.0 to 60.0 mass % of $Al_2O_3$, and 30.0 to 55.0 mass % of $SiO_2$.

3. The porous material according to claim 1,
    wherein the rare earth oxide is at least one selected from the group consisting of yttrium, lanthanum, cerium, praseodymium, neodymium, samarium, europium, gadolinium, terbium, dysprosium, holmium, erbium, thulium, ytterbium and lutetium.

4. The porous material according to claim 1,
    wherein the bonding material contains 50 mass % or more of crystalline cordierite in the whole bonding material.

5. The porous material according to claim 1,
    wherein the aggregates are silicon carbide particles or silicon nitride particles.

6. The porous material according to claim 1,
    wherein a porosity is from 35 to 75%.

7. The porous material according to claim 1,
    wherein a thermal expansion coefficient is $4.0 \times 10^{-6}$/K or less.

8. A honeycomb structure which is constituted of the porous material according to claim 1, and
    comprises partition walls defining a plurality of cells extending from a first end face which is one end face to a second end face which is the other end face.

9. The honeycomb structure according to claim 8,
    which comprises plugging portions disposed in open ends of the predetermined cells in the first end face and open ends of the residual cells in the second end face.

10. The porous material according to claim 1, wherein the addition of the rare earth oxide or the zirconium oxide broadens the temperature range within which the porous material will sinter in a non-oxidizing atmosphere or atmosphere having an oxygen partial pressure of 10% or less to 1370° C. to 1450° C.

11. A manufacturing method of a porous material, comprising:
    firing, at 1370 to 1450° C., a raw material for the porous material containing:
        aggregate powder; and
        a raw material for a bonding material including a cordierite forming raw material and a rare earth oxide or a zirconium oxide in an amount of 1.5 to 10.0 mass %, and
    containing 12 to 45 mass % of the raw material for the bonding material in a total mass of the aggregate powder and the raw material for the bonding material, to manufacture the porous material;
    wherein a bending strength of the porous material is 10 MPa or more and a bending strength/Young's modulus ratio is $1.8 \times 10^{-3}$ or more.

* * * * *